UNITED STATES PATENT OFFICE.

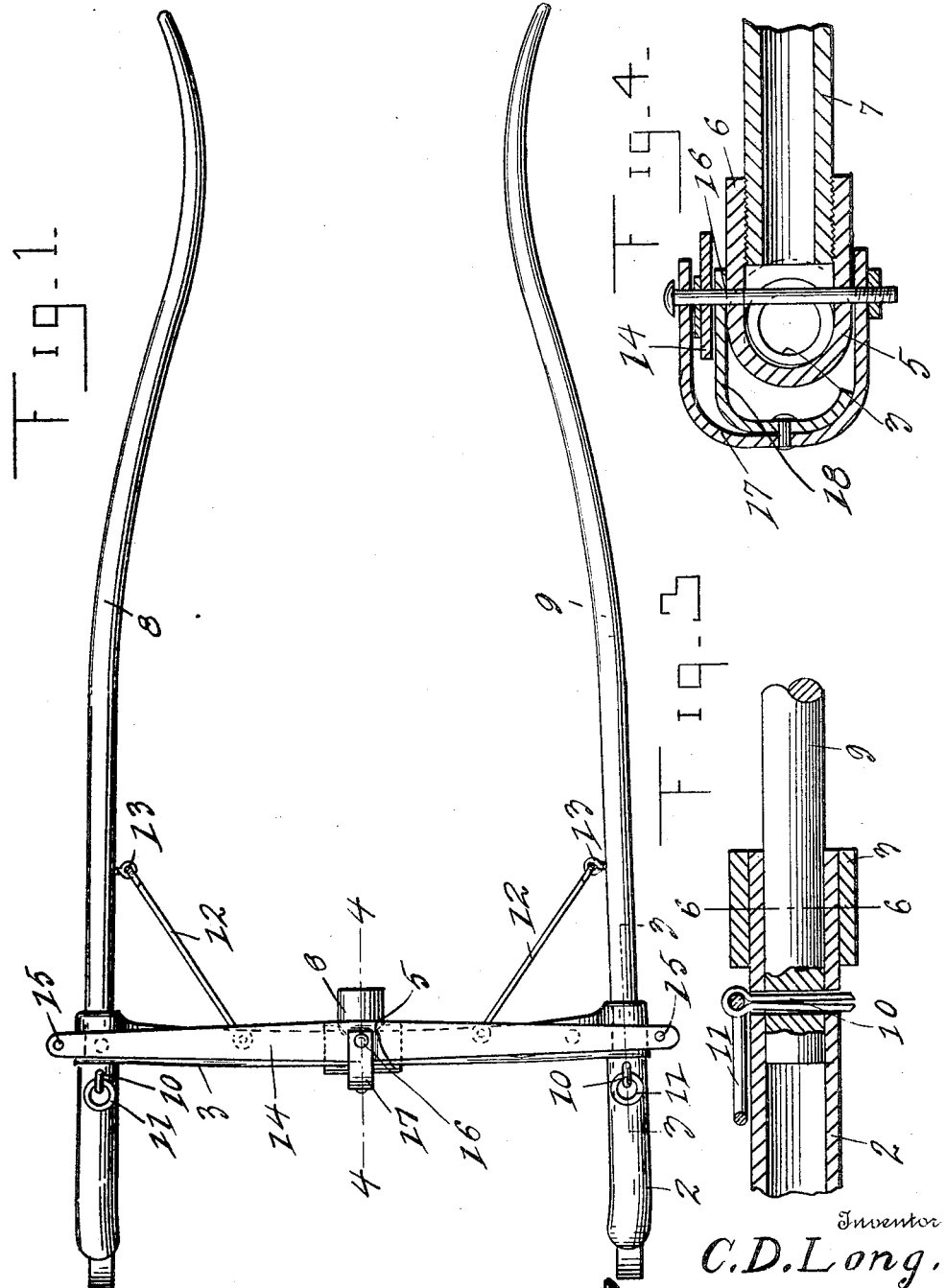

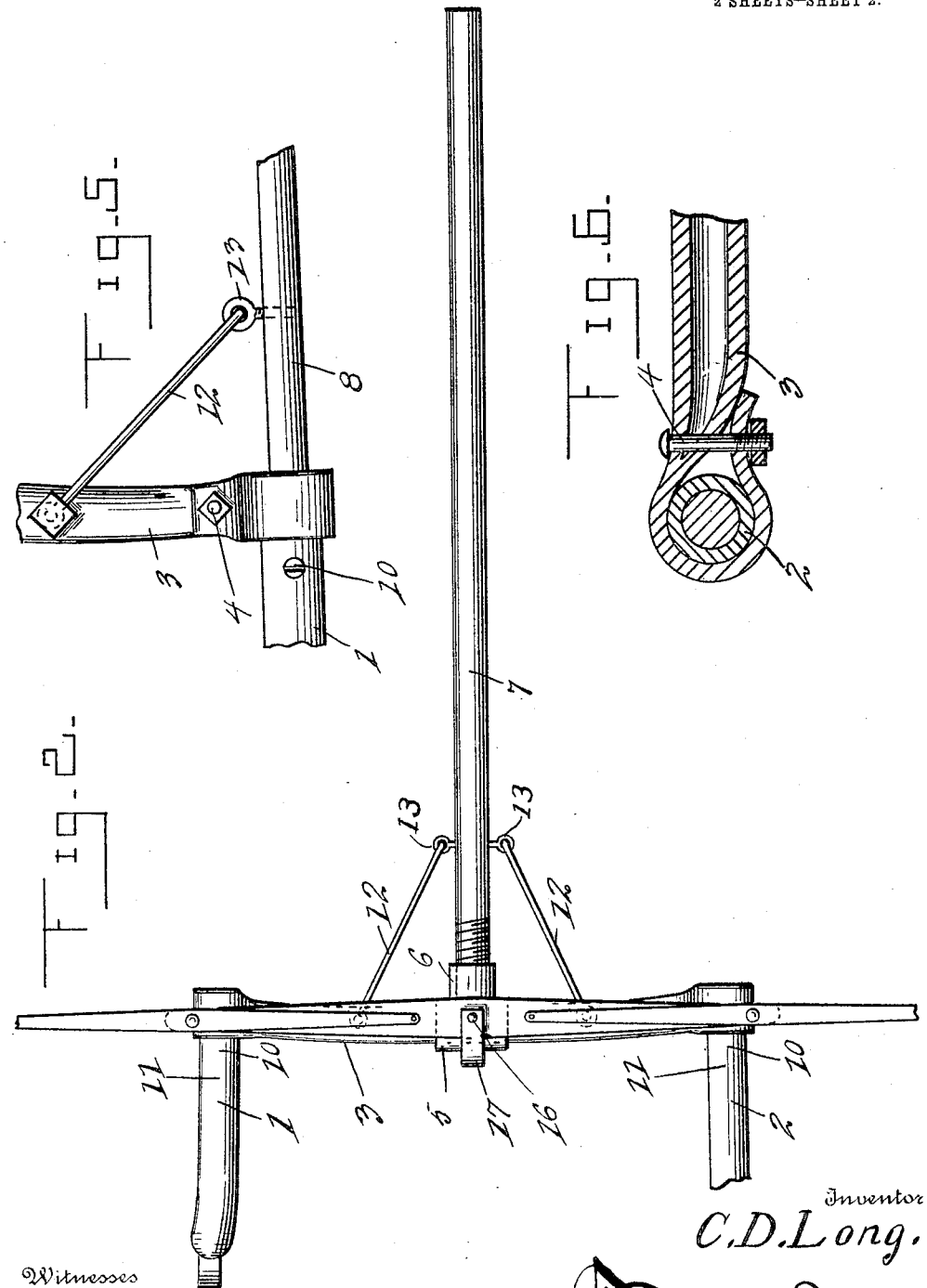

CHESTER D. LONG, OF WINCHESTER, ARKANSAS.

CONVERTIBLE DRAFT APPLIANCE.

1,133,981.   Specification of Letters Patent.   Patented Mar. 30, 1915.

Application filed April 4, 1913. Serial No. 758,919.

*To all whom it may concern:*

Be it known that I, CHESTER D. LONG, a citizen of the United States, residing at Winchester, in the county of Drew and State of Arkansas, have invented certain new and useful Improvements in Convertible Draft Appliances; and I do hereby declare the following to be a full, clear, and exact description of the invention, such as will enable others skilled in the art to which it appertains to make and use the same.

This invention relates broadly to new and useful improvements in carriages and wagons and has particular reference to draft appliances for vehicles.

The principal object of this invention resides in the provision of a convertible draft appliance in which the thills and pole may be readily and quickly interchanged to permit a double or single team to be driven to the vehicle.

A further object of this invention contemplates the construction of the draft appliance with such regard to proportion, number and arrangement of parts that it may be cheaply manufactured, will be efficient and durable in its operation, and will permit the ready replacing of parts in case of breakage.

The above and additional objects are accomplished by such means as are illustrated in the accompanying drawings, described in the following specification and then more particularly pointed out in the claim which is appended hereto and forms a part of this application.

With reference to the drawings, wherein I have illustrated the preferred embodiment of my invention as it is reduced to practice, and throughout the several views of which similar reference numerals designate corresponding parts: Figure 1 is a top plan view of the invention as it is used for driving a single team. Fig. 2 is a similar view illustrating the device ready for use with a double team. Fig. 3 is a section on the line 3—3 of Fig. 1. Fig. 4 is a section on the line 4—4 of Fig. 1. Fig. 5 is a detail view illustrating the method of attaching and bracing the cross bars to the thill and draft iron; and Fig. 6 is a section on the line 6—6 of Fig. 3.

Proceeding now to the description of the drawings, the numerals 1 and 2 designate the draft irons. The draft irons of this invention may be secured to the axle of a vehicle in any suitable manner, and are made in the preferred embodiment of metal piping bent into an arcuate shape in the usual manner. The free ends of the irons 1 and 2 are connected by a cross bar 3, also formed in the preferred embodiment of a length of metal piping, the terminal portions of which are flattened, as in Fig. 6, and are bent to encircle the terminal portion of the members 1 and 2, being held in secure frictional engagement therewith by means of a bolt or similar fastening device 4. The cross bar 3 is formed in two sections joined by a T joint 5. The member 6 of the joint 5 is internally screw threaded to receive the threaded ends of a pole 7, also made of metal piping. It will be seen that by this connection there is provided an effective means for readily attaching and detaching the pole and the cross bar 3. A pair of thills 8 and 9 of customary structure and formed of the same material as the pole 1, have an exterior diameter slightly less than the interior diameter of the irons 1 and 2, and are designed to be attached to the irons 1 and 2 by the insertion of their free ends within the irons. In holding the members 8 and 9 in attached position this invention employs a pair of cotter pins 10 seated in registering bores formed in the members 1 and 2 and terminal portions of the thills 8 and 9, as illustrated in Fig. 3. The members 10 may be provided with finger rings 11 for the obvious purpose of facilitating the insertion and withdrawal of the pins.

As a means for bracing the thills or pole and holding them in desired alinement with the irons 1 and 2, there has been provided a pair of brace rods 12 pivotally connected to the member 3 and approximately midway each section thereof. The rods 12 are each provided with a hook at one end and designed to engage eyes 13 at opposite sides of the pole or upon the inner sides of the thills or shafts 8 and 9. In order to facilitate the conversion of this device from a single to a double team appliance, this invention employs a single draft tree 14, the terminal portions of which are provided with suitable apertures 15 adapted to receive the pivot pins of a pair of swingle trees when the device is employed as a double team appliance. When using the device in connection with a single team, the member 14 serves as a swingle tree. The member 14 is pivotally mounted on the cross bar 3 being held in the desired position by a bolt or other suitable type of pivot pin 16, operating in a suitable bore formed in the member 5. In order to limit the rotation of the member 14, there has been provided a substantially U-shaped stop arm 17 pivotally mounted at each free end around the projecting ends of the bolt 16, and carrying a spacing plate 18 which is adapted to hold the member 14 in spaced relation from the bar 3. The actual construction of the device being thus disclosed it now remains to emphasize the numerous advantages resulting from the novel form of structure of this invention. In this connection it is to be observed that by merely threading or unthreading the pole 7 into the socket 6 and attaching or detaching the members 8 and 9 to the irons 1 and 2 in the manner above described, the device may be quickly converted from a double team to a single team draft appliance. It is desirable also to direct attention to the fact that the pole 7, irons 1 and 2, thills 8 and 9, and cross bars 3, and the T joint 5 are all made of ordinary piping which feature is believed to be important in view of the fact that the device may be more cheaply manufactured, and will be more durable and efficient in its operation, than other appliances of the same nature now on the market.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

What is claimed is:

The hereindescribed convertible draft appliance for vehicles comprising a pair of hollow draft irons having unthreaded ends; a tubular metal cross bar comprising two sections connected at their outer ends to the draft irons and having their inner ends connected by a T-coupling, one nipple of said T-coupling being interiorly screw threaded to receive the threaded inner end of a draft pole; a pair of shafts having plane solid rear ends fitted in the unthreaded ends of the draft irons and held therein by cotter pins; and braces pivotally connected to the cross bar sections for detachable connection to screw eyes on the shafts and pole.

In testimony whereof I affix my signature in presence of two witnesses:

CHESTER D. LONG.

Witnesses:
GARLAND PASCHALL,
HARRY EVERSFIELD.

Copies of this patent may be obtained for five cents each, by addressing the "Commissioner of Patents, Washington, D. C."